(No Model.)

J. P. HUNT.
CABLE RAILWAY.

No. 312,721. Patented Feb. 24, 1885.

WITNESSES:
V. H. Ernst.
C. Sedgwick.

INVENTOR:
J. P. Hunt
BY Munn & Co.
ATTORNEYS.

UNITED STATES PATENT OFFICE.

JOHN P. HUNT, OF PHILADELPHIA, PENNSYLVANIA.

CABLE RAILWAY.

SPECIFICATION forming part of Letters Patent No. 312,721, dated February 24, 1885.

Application filed May 7, 1884. (No model.)

*To all whom it may concern:*

Be it known that I, JOHN P. HUNT, of the city and county of Philadelphia, Pennsylvania, have invented a new and useful Improvement in Cable Railways, of which the following is a full, clear, and exact description.

The object of my invention is to provide certain new and useful improvements in cable railways for the purpose of cleaning the trough, channel, or conduit in which the cable runs, and removing dirt, mud, and other matter that falls into the conduit through the slot in the top.

The invention consists in the combination, with a cable, of brushes, balls, disks, or other cleaning devices, secured on the same for the purpose of cleaning the trough and sweeping dust, dirt, and other matter out of the said trough or conduit, which cleaning-cable is provided in addition to the usual traction-cable.

Reference is to be had to the accompanying drawings, forming part of this specification, in which similar letters of reference indicate corresponding parts in both figures.

Figure 1:
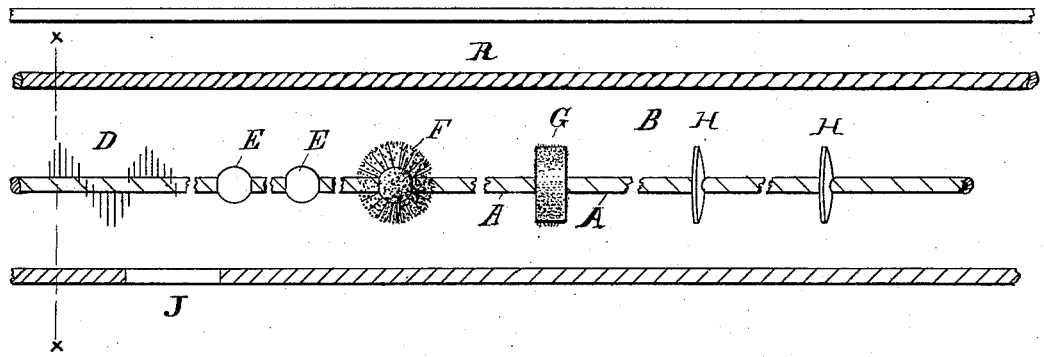
Figure 2:
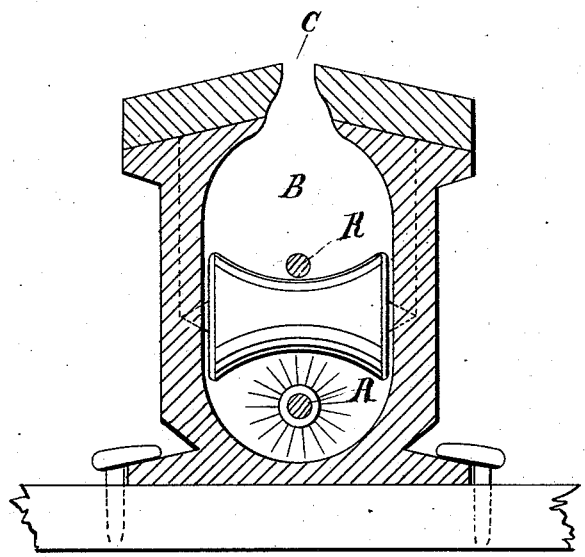

Figure 1 is a longitudinal sectional elevation of the conduit, showing different cleaning devices on the cable; and Fig. 2 is a cross-sectional elevation of the same on the line $x$ $x$, Fig. 1.

The cable A runs in a trough or conduit, B, having a longitudinal slot, C, in its top, the cable A running along the bottom of the trough and below the traction-cable R and the rollers supporting the same. On the cable A spiral brushes D, balls E, or balls F, provided with projecting wires or bristles, circular brushes G, circular plates H, or other suitable devices, are secured at suitable intervals. As the cable A moves through the conduit, the cleaning devices on the cable carry the dust, dirt, sand, street-sweepings, mud, &c., that have collected in the trough through the same to suitable outlet-openings, J, through which the refuse, &c., drops into suitable collecting-boxes. The said devices thus keep the trough clean and prevent any accumulation of dirt. As such conduits have a slot in the top, the quantity of matter accumulating in the trough or conduit is very great, and for that reason means must be provided for cleaning the troughs.

The above-described device can be used in cable-troughs of all kinds and of all constructions, and the devices may be arranged a greater or less distance apart on the cable, as circumstances may require. If the conduit or trough is to be cleaned, all that is necessary is to run the cleaning-cable through it one or more times. A chain can be used instead of the cleaning-cable.

Having thus described my invention, I claim as new and desire to secure by Letters Patent—

1. In a cable railway, the combination, with the cable-trough, of a traction-cable and of a supplementary cleaning-cable below the traction-cable, substantially as herein shown and described.

2. In a cable railway, the combination, with the trough and the traction-cable, of a supplementary cable, and brushes, balls, disks, or other projections secured on the said supplementary cable, for the purpose of cleaning the conduit or trough and removing dust, dirt, and other like matter from the same, substantially as herein shown and described.

JOHN P. HUNT.

Witnesses:
T. ELLWOOD POTTS,
JOHN H. MYERS.